United States Patent
May

(10) Patent No.: US 7,697,200 B2
(45) Date of Patent: Apr. 13, 2010

(54) SCREEN HAVING IMAGE VIEWABLE ONLY IN AMBIENT LIGHT

(75) Inventor: Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 11/698,648

(22) Filed: Jan. 25, 2007

(65) Prior Publication Data

US 2008/0180797 A1    Jul. 31, 2008

(51) Int. Cl.
*G03B 21/56* (2006.01)
(52) U.S. Cl. .................... 359/443; 359/449; 359/460; 40/124.02
(58) Field of Classification Search .......... 359/443, 359/460, 449; 40/124.02, 453
See application file for complete search history.

(56) References Cited

U.S. PATENT DOCUMENTS

| | | | | |
|---|---|---|---|---|
| 3,090,280 A | * | 5/1963 | Winter, Jr. | ................... 353/28 |
| 6,384,970 B1 | * | 5/2002 | Abe et al. | ................... 359/455 |
| 6,818,276 B2 | | 11/2004 | Bourdelais et al. | |
| 6,967,053 B1 | | 11/2005 | Mullen et al. | |
| 7,446,940 B2 | * | 11/2008 | Emslander et al. | .......... 359/618 |
| 2007/0217004 A1 | * | 9/2007 | Smith et al. | ................. 359/456 |

OTHER PUBLICATIONS

Retroreflector; Wikipedia; http://en.wikipedia.org/wiki/Retroreflector; taken from site Nov. 17, 2006.
Wedgwood projector screen information; Wedgwood IT Group; http://www.wedgwood-group.com/projector_screen_info.htm; taken from site Nov. 17, 2006.

* cited by examiner

*Primary Examiner*—Christopher Mahoney

(57) ABSTRACT

A reflective display screen comprises a first component surface responsive to absorb low level ambient light from above the screen and a second surrounding component surface responsive to light of high intensity from an image source. The first component surface is graphically formed to represent a fixed permanent image within the screen viewable only in ambient overhead lighting and without incidence of the high intensity light from the image source. Other embodiments include a method of displaying a permanent, fixed image and a method of making a display screen.

3 Claims, 4 Drawing Sheets

SCREEN HAVING IMAGE VIEWABLE ONLY IN AMBIENT LIGHT

BACKGROUND

Video conference systems, home theatres, and other situations often have screens used for the display of images thereon. When not in use, these screens typically present a large white, gray, or silver area. This area is wasted space when the screen is not in use.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a component surface" includes reference to one or more of such surfaces.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

When a display screen is not in use, this space is visually uninteresting and essentially wasted. Accordingly, it has been recognized by the present inventors that this space can be used for advertising. For example, a business logo may be included in the screen so that it is visible when the screen is not being used for the display of images. Of course, it is desirable that the logo is not visible when the screen is in use for the display of images. While a logo can be provided by electronically forming and projecting an image of the logo onto the screen, such an approach is undesirable because of the additional complexity it adds to the system and the additional power consumed when the projection equipment is left on. Furthermore, if the projection equipment is shut off, the logo will disappear, leaving a blank screen.

Accordingly, embodiments of the present invention include a display screen where a fixed, permanent image is formed in the screen and is viewable when the projection system is turned off. The screen creates the image in the reflection of ambient light coming from a particular direction. Because the image is formed passively, modifications to the projection equipment are not required. As will be discussed in further detail below, the screen can be easily manufactured, helping to keep costs low.

Figure 1:
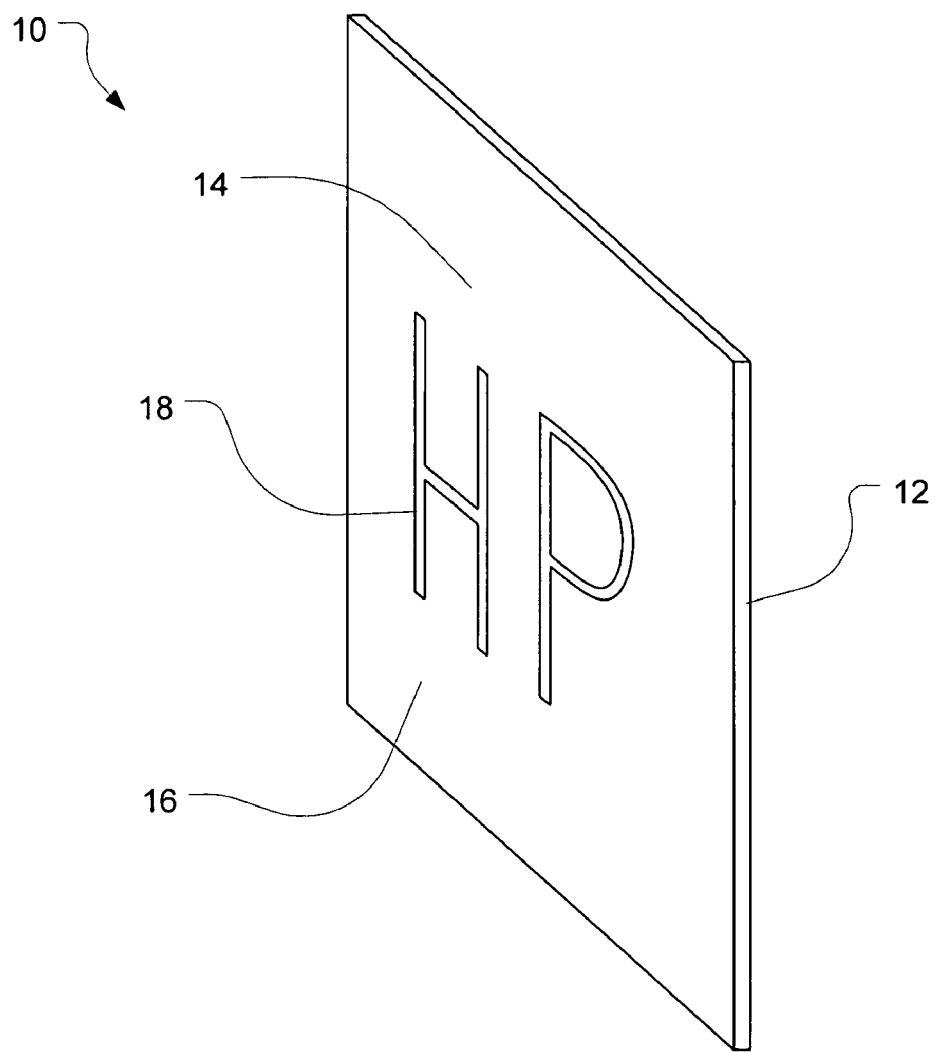
FIG. 1 is a perspective view of a reflective display screen in accordance with an embodiment of the present invention.

One exemplary embodiment of the present invention is a reflective display screen for use within a lighted room subject to overhead ambient lighting, in combination with light from an image source. The screen, shown generally at 10 in FIG. 1, includes a screen substrate 12, a first component surface 14 and a second component surface 16. The first component surface is responsive to absorb low level ambient light from above the screen. The second component surface surrounds the first component surface and is responsive to light of high intensity from the image source. The second surface provides optical properties for displaying high intensity images from the image source to a viewing audience. The first component surface is graphically formed in the screen to represent a fixed permanent image 18 within the screen which can be viewed only in ambient light. For example, the fixed permanent image can be a business logo or trademark. The fixed permanent image can provide the appearance of a watermark in response to ambient light alone.

Figure 2:
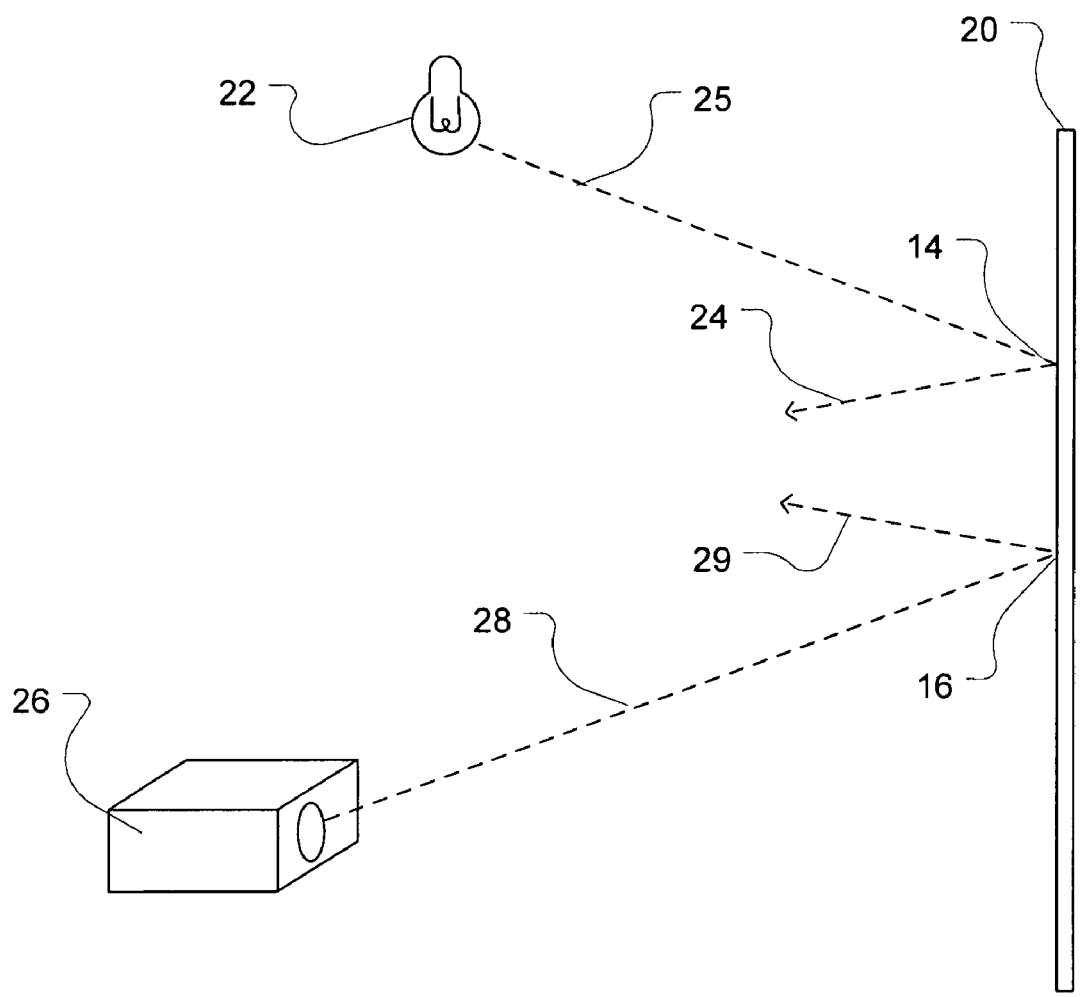
FIG. 2 is a schematic showing use of a reflective display screen in accordance with an embodiment of the present invention.

The display screen can be a reflective screen, for example as illustrated in FIG. 2. The reflective screen 20 reflects high intensity light from an image source. For example, the image source can be a projector.

Figure 4:
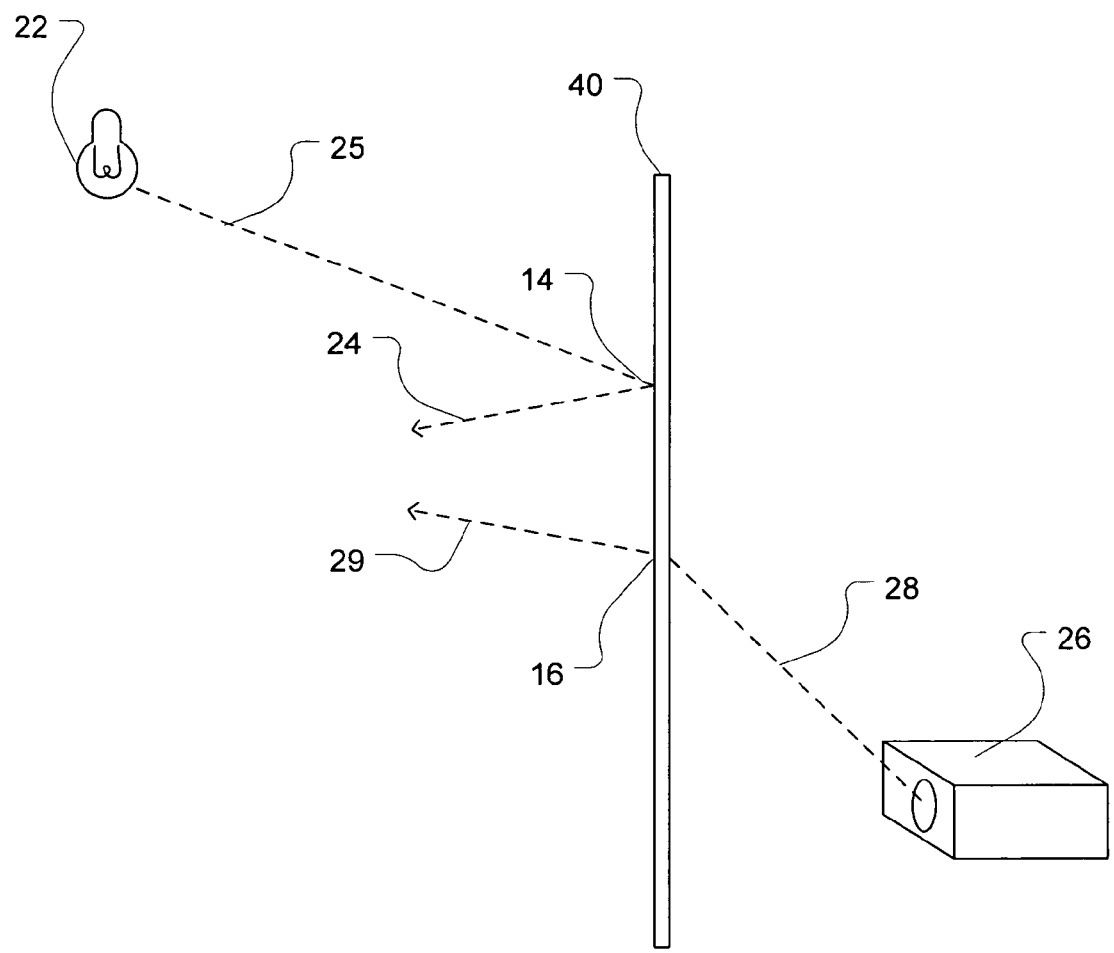
FIG. 4 is a schematic showing use of transmissive display screen in accordance with an embodiment of the present invention.

As another example, as illustrated in FIG. 4, the display screen can be a transmissive screen. The transmissive screen 40 transmits high intensity light from an image source. For example, the image source can be a projector, a cathode ray tube gun, or the liquid crystal display.

Turning to the display screen in further detail, in an embodiment the display screen 10 (FIG. 1) can include a rough surface, wherein the first component surface is 14 disposed on upward facing portions of the surface. The first component surface can be configured to absorb ambient light based on properties selected from the group of physical properties consisting of color, reflectivity, texture, and combinations thereof. Color can include response to visible and non-visible wavelength spectral responses. The first component surface may be embedded in the screen substrate, for example, as part of the screen substrate material. As another example, the first component surface may be positioned over the screen substrate, for example, by depositing the first component surface onto the screen substrate.

The second component surface 16 can be a reflective material to reflect the high intensity light from the image source and deposited on image source facing portions of the screen substrate features, for example, by low angle deposition. The second component surface may be positioned over the first component surface.

As a more particular example, the first component surface 14 may be a dark material that tends to absorb ambient light and the second component surface 16 may be a light material that tends to reflect high intensity projected light. Subtle differences in the color, reflectivity, or texture of the first component surface can be used to provide subtle differences in the amount of reflected ambient light to form the fixed permanent image 18 within the screen 10.

Operation of one embodiment of a reflective display screen will be further described with reference to FIG. 2. Ambient light 25, coming from an overhead ambient light source 22, is reflected by the first component surface 14 of the screen 20. Different portions of the first component surface 14 have differing properties so that the fixed permanent image 18 can be viewed in the reflected ambient light 24 in the absence of high intensity projected light.

When the screen 10 is in use, an image source 26 projects high intensity light 28 toward the screen which is reflected primarily by the second component surface 16. The reflected high intensity light 29 provides the viewable image. When the high intensity light is present, it tends to wash out the fixed permanent image so that it is not visible in the presence of high intensity projected light.

The washing out of the fixed permanent image when high intensity projected light is present is possible, in part, because of the characteristics of the human eye. While the human eye has a wide viewing range, this is partly a function of the iris. The iris adjusts to the general level of lighting in an environment to provide a large overall range of viewing ability. The ability of the eye to discern differences within a scene, however, is limited when exposed to extremely different lighting situations.

In the presence of ambient light only, the eye will adjust to the lighting conditions, making it sensitive to the subtle variations in ambient light reflected by the first component surface. Since there is no projected light, there are no significant reflections from the second component surface coming, for example, from the direction of the image source.

When the image source is turned on, the eye adjusts to the brighter image coming from the image source and reflected by the second component surface. Because the second component surface is reflective, the projected image is quite bright on the second component surface, overwhelming the subtle variations in ambient light reflected by the first component surface. The iris will adjust to the brighter projected image. If the projected image is sufficiently bright and the fixed, permanent image has sufficiently low contrast, the fixed, permanent image is not perceptible in the presence of the projected image. The high intensity image from the image source is thus the dominant visual image for a viewing audience.

Figure 3:
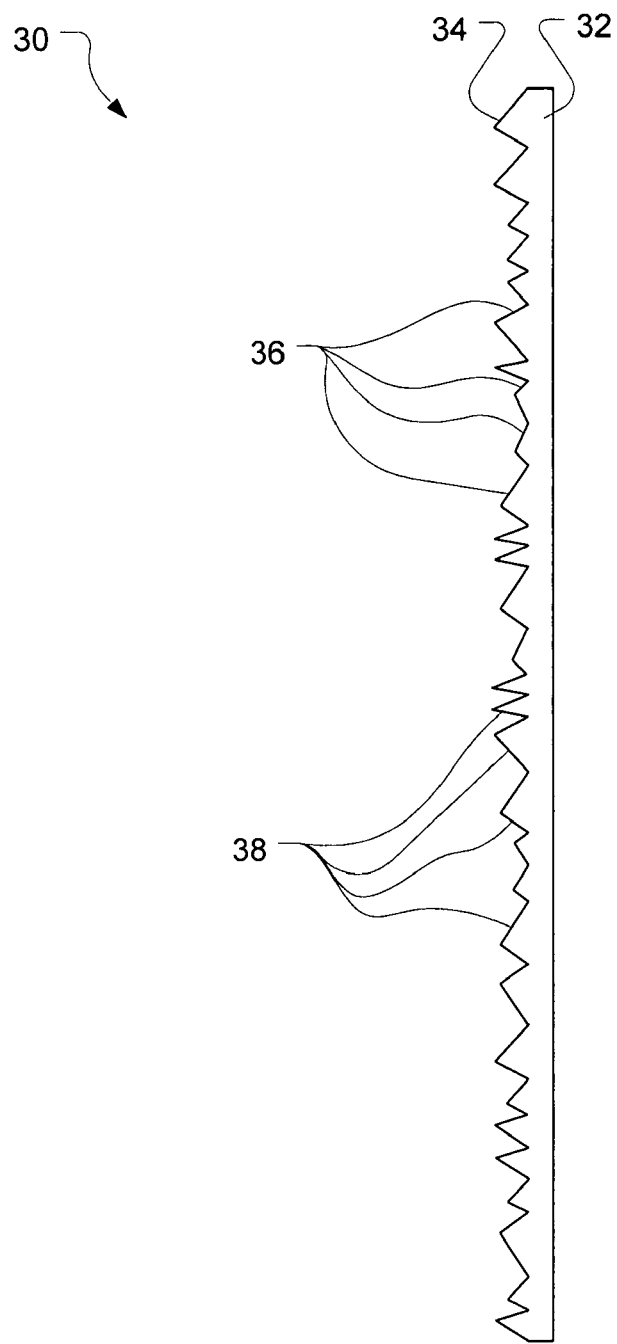
FIG. 3 is a side cross section view of a reflective display screen in accordance with an embodiment of the present invention.

FIG. 3 provides a detailed illustration of a reflective display screen 30 in accordance with an embodiment of the present invention. The screen substrate 32 includes a textured surface 34, which defines upward facing 36 and downward facing 38 portions. The upward facing portions face generally toward an ambient light source, and include an absorptive first component surface. Subtle variations in the first component surface provide a fixed, permanent image, viewable in ambient light. The downward facing portions face generally toward the image source, and include a reflective second component surface. The second component surface reflects high intensity light from the image source toward the viewing audience.

It has been observed that slight variations in texture may be viewable if not done carefully. Accordingly, it can be desirable to maintain a consistent texture for the screen and use slight variations in color, absorption ability, or both to tune the appearance of the fixed permanent image. For example, by maintaining low reflectivity for light from the image source (e.g., red, green, and blue) light while allowing slightly higher reflectivity for other colors not generally present in the image (e.g., infrared, ultraviolet, colors other than red, green and blue, etc.) the visibility of the fixed permanent image in ambient light may be enhanced without affecting the high intensity light from the image source.

Of course, the positioning of the first component surface and second component surface is not limited to being on upward and downward facing portions of the screen. Other orientations may be used, depending on the application. For example, where ambient light comes from a window, the first component surface may be disposed on window facing portions of the screen. Where an image source is a ceiling mounted projector, the second component surface may be disposed primarily on upward facing portions. Multiple fixed permanent images may be formed on different facing portions of the screen, and a particular image made visible using directional illumination, e.g. from side lighting, overhead lighting, underneath lighting, etc.

The reflective screen 30 can be used advantageously as a part of a conferencing system. For example, the screen can be coupled to audio/video hardware (not shown) to provide electronic data forming part of an operable video conference system. The fixed permanent image can be visible during periods in which the audio/hardware is inoperative.

In another embodiment, the display screen can be a transmissive display screen as illustrated in FIG. 4. The transmissive display screen 40 includes a first component surface 14 which reflects ambient light to form the fixed permanent image 18, for example as described above. An image source 26 transmits high intensity light 28 light through the second component surface 16 to form the image 29. When the high intensity light is present, it visually overwhelms reflected ambient light, making the fixed permanent image not visible, for example, as described above.

It will be appreciated that, because the fixed, permanent image is graphically formed in the screen, it is automatically displayed in response to ambient light in the absence of high intensity light from the image source. Thus, complex electronics are not necessary to form the fixed, permanent image. Furthermore, the fixed, permanent image is displayed even when the image source (e.g., projection or video conference equipment) is turned off. The fixed permanent image may also be displayed in the absence of high intensity light (e.g., a dark scene commercial break where the intensity of the image is so low that the ambient room light overpowers the projected light)

In one embodiment, the fixed permanent image can be formed so that it is viewable in low light levels where a person's viewing adapts for night vision in the absence of high intensity light from the image source. For example, the human eye is more sensitive in the blue-green range when adapted for night vision, and requires higher lighting levels to perceive red-yellow. Hence, the first component surface may be selected to include subtle variations which are viewable when the eye is adapted for night vision that are not easily viewed in brighter conditions.

Various ways of making the reflective display screen are possible. The screen can be constructed on a substrate, and the first and second component surfaces formed in the screen substrate. The substrate may provide a rough or irregular surface. More particularly, in an embodiment, the substrate may be provided by a substrate having a plurality of particles affixed thereto. Various dimensions and geometries of the particles can be used. For example, the particles can be uniformly or irregularly shaped. Generally, the dimensions of the particles can be large relative to the wavelength of visible light to help avoid diffraction and interference effects, while small enough to help avoid pixilation or sparkle. Accordingly, in one embodiment, the particles can have sizes in the range of about 4 microns to about 500 microns. Generally, when the distance from the screen to a viewer is larger, larger particles can be used without resulting in undesirable pixilation or sparkle.

The first component surface can be formed in the screen substrate, for example, by positioning the first component over or within the screen substrate. For example, the first component surface may be formed by pigment included within the particles or within the substrate. As another example, the first component surface may be formed by coating the substrate, for example, by vapor deposition, jetting, printing, or similar processes. The first component surface may be light absorbing, for example, by including black or dark colored pigment.

The fixed permanent image can be graphically formed in the first component by slightly varying the optical properties of the first component. For example, the fixed permanent image can be graphically formed by slight color variations in the first component. The fixed permanent image can be formed as a business logo, picture, text, or the like.

The second component can be formed in the screen substrate, for example, by low angle deposition of a material onto the screen substrate. Low angle deposition can be performed by coating the substrate, for example, by vapor deposition, jetting, printing, or similar processes. For example, low angle deposition can be performed from an oblique angle. The second component may be reflective, for example, by including a white pigment, reflective metal particles, or the like.

Summarizing and reiterating to some extent, a reflective display screen in accordance with embodiments of the present invention can provide a useful display even when no image is being projected onto the screen. For example, a fixed, permanent image can be graphically formed into the screen. The fixed, permanent image can be visible in ambient light only when the screen is not being projected onto. The fixed, permanent image can be graphically formed into a screen component so that it does not interfere with the projection of images, being essentially invisible when the screen has high intensity light projected thereon to form images. The fixed, permanent image can be, for example, a business logo, helping to provide brand recognition or differentiation of products.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A display screen for use within a lighted room subject to ambient lighting, in combination with light from an image source, comprising:
   a.) a screen substrate comprising
      a first component surface responsive to absorb low level ambient light more absorptively for colors of light from the image source relative to other colors, and
      a second, surrounding component surface, responsive to light of high intensity from the image source;
   b.) the second component surface providing optical properties for displaying high intensity images from the image source to a viewing audience; and
   c.) the first component surface being graphically formed in the screen to represent a fixed permanent image within the screen which can be viewed only in ambient lighting and without incidence of the high intensity light from the image source.

2. A display screen as defined in claim 1, wherein the fixed image comprises a business logo.

3. A display screen as defined in claim 1, further comprising audio/video hardware coupled to the screen to provide electronic data forming part of a video conferencing system wherein the permanent image is visible during periods in which the audio/video hardware is inoperative.

* * * * *